United States Patent
Allum

(10) Patent No.: US 6,183,274 B1
(45) Date of Patent: Feb. 6, 2001

(54) ELECTRONIC INTERFACE CONNECTOR COVER AND METHOD OF USING SAME

(75) Inventor: Norman Andrew Allum, San Diego, CA (US)

(73) Assignees: Sony Corporation, Tokyo (JP); Sony Electronics, Inc., Park Ridge, NJ (US)

( * ) Notice: Under 35 U.S.C. 154(b), the term of this patent shall be extended for 0 days.

(21) Appl. No.: 09/256,348

(22) Filed: Feb. 24, 1999

(51) Int. Cl.⁷ ................................................. H01R 13/44
(52) U.S. Cl. ............................................................. 439/135
(58) Field of Search .................................... 439/135, 148, 439/134; D13/154, 156

(56) References Cited

U.S. PATENT DOCUMENTS

D. 409,986 * 5/1999 Libecap ................................ D13/156
4,662,697 * 5/1987 Moses .................................... 439/148
5,320,542 * 6/1994 Cheng .................................... 439/148

* cited by examiner

Primary Examiner—Khiem Nguyen
Assistant Examiner—Hae Moon Hyeon
(74) Attorney, Agent, or Firm—Ronald P. Kananen; Rader, Fishman & Grauer

(57) ABSTRACT

A protective cover for an external electrical interface port or connector on an electronic device which cover can be releasably engaged with an object when not in position protecting the electrical interface so as to prevent the cover from being lost or misplaced. One or two pairs of prongs may be provided on the cover so as to clip the cover to an electrical cord which is, in turn, connected to the electrical interface of the electronic device.

11 Claims, 2 Drawing Sheets

ELECTRONIC INTERFACE CONNECTOR COVER AND METHOD OF USING SAME

FIELD OF THE INVENTION

The present invention relates to the field of electronic devices, e.g. wireless telephones and computers, which are routinely interfaced electrically with other peripheral devices or accessories. More specifically, the present invention relates to a cover which is removably attached to an electronic device so as to cover an electrical interface of that device by preventing dust and moisture from collecting in the interface and by preventing the interface from being inadvertently damaged. The cover of the present invention also incorporates a means to prevent the cover from being lost or misplaced.

BACKGROUND OF THE INVENTION

Modern electronic devices provide a vast array of features that are extremely useful in organizing and communicating information. Moreover, as such devices have evolved, they have generally become more compact and portable so as to be available whenever and wherever needed.

For example, wireless telephone units allow user to place a phone call and exchange information of data from virtually any location within the service area. Wireless telephone units typically incorporate a rechargeable battery pack so that the device can be completely mobile. However, these battery packs must be periodically connected to a power source so as to be recharged before use. Usually an external interface is provided on the device for connecting the battery or battery pack to an external power source. Additionally, an external interface might be provided on a wireless telephone to allow the phone to connected to a laptop or other computer device so that data can be transmitted from the computer over the wireless connection made by the phone.

Laptop computers provide another example of an electronic device that is fully portable and can be used wherever needed. Modern laptop computers can provide all the power of a desktop computer. Additionally, a laptop computer can be readily connected to a host of peripherals or accessories in order to greatly increase the useful functions that computer can perform. To accomplish this, the typical laptop may have several external ports or connectors to which peripheral devices and accessories can be interfaced.

For example, a laptop may have an external interface for connecting the laptop to a printer so as to provide hardcopy output. Additionally, a laptop may include an external connector to an internal modem or an interface for connecting to an external modem. Through a modem, internal or external, a laptop can be connect to the public phones lines so as to send a fax, connect to a company network or connect to the internet for sending and receiving e-mail or surfing the world wide web.

A laptop may also have external interfaces for connecting the laptop to a full-size keyboard or a full-size computer monitor so that the laptop user is not required to make use exclusively of the smaller keyboard and display which are part of the laptop itself. In fact, a current trend has been to completely replace desktop computers with a docking station through which a laptop is connected to, for example, a full-size keyboard, a full-size monitor such as a cathode ray tube monitor, a printer and a LAN (local area network) or WAN (wide area network).

Where such a docking station is provided, the laptop can completely replace a desktop computer with no loss of comfort to the user. Then, when the user desires to leave the office or home area, the laptop is simply disconnected from the docking station. Consequently, the user need never synchronize information between two computers, i.e., separate desktop and laptop computers.

Wireless telephones and laptop computers are not the only modern electronic devices which can be connected to other devices to increase functionality. For example, even smaller computers such as palmtop or electronic notepad computers can be connected to larger computer systems, modems or printers to provide additional functions.

In all these examples, an electronic device needs an external port, interface or connector so as to be readily connected electrically to a peripheral device, accessory or network. However, such external interfaces must be protected in order to continue to function properly.

For example, when an external interface on an electronic device is not connected, e.g. via a cable, to a peripheral device, the interface may collect dust or moisture which degrades the quality of an electrical connection made through that interface. Additionally, as often happens with portable devices, the device may be dropped or scrapped against another object. This may damage an external interface which will then not connect properly to an external device.

To protect external interfaces, ports and connectors on electronic equipment, it is common to provide a cover that can, for example, be snapped or slid into place over the interface. However, there are a number of drawbacks with these prior art arrangements.

For example, if the cover is permanently attached to the electronic device, it may interfere with connections, particularly computer docking stations, to which the device is to be connected. A cover attached to the electronic device may also become caught on or interfere with a case for the device.

Alternatively, covers that are completely removable, such as those that snap into place or are otherwise adhered to an electronic device to protect external interface ports and connectors, have an even more severe problem. When such covers are removed from the electronic device so that the covered interface can be accessed, it is very easy to misplace and loose the cover.

Therefore, a need exists in the art for a protective cover for the external ports and connectors of an electronic device that overcomes the foregoing problems. Particularly, there is a need for a protective cover that is not readily lost when removed.

SUMMARY OF THE INVENTION

It is an object of the present invention to meet the above-described needs and others. Specifically, it is an object of the present invention to provide a protective cover for an external interface port or connector of an electronic device that is easily and completely removed so as not to interfere with any connection made through that interface and which further is provided with a means to prevent it from being easily lost or misplaced.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a protective cover for an external electrical interface on an electronic device, the cover including a means to prevent loss of the cover. The cover of the present invention includes a first device or fastener for releasably engaging the cover to the electronic device in a position protecting the electrical interface; and a second device, disposed on the cover, for releasably engaging the cover to a portion of the electronic device, or to a second electronic device or to an electrical cable which can be connected to the electronic device, in a position removed from the interface so as to allow access to the interface.

The second device may include at least one pair of prongs which are sized and shaped so as to releasably engage the cover with an electrical cable. Preferably, this electrical cable includes a connector for connecting to the electrical interface of the electronic device. For added strength, the second device means may include two pairs of prongs for releasably engaging the cable. Preferably, the prongs are disposed on a side of the cover which is internal to a housing of the electronic device when the first device or fastener attaches the cover to the electronic device to protect the electrical interface.

Alternatively, if the second device is used to attach the cover to a portion of the electronic device itself, the electronic device may include a portion specially designed for engaging with the cover. A specially designed portion of the electronic device would be a portion the primary purpose of which is to engage the cover when the cover is not protecting an electrical interface.

The present invention also encompasses a method of using a protective cover for an external electrical interface on an electronic device so as to prevent the cover from being lost or misplaced by releasably engaging the cover to an object when the cover is not in position protecting the electrical interface. As before, preferably, the object to which the cover is engaged is an electrical cable, and the step of engaging includes releasably engaging a pair of prongs on the cover with the electrical cable.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
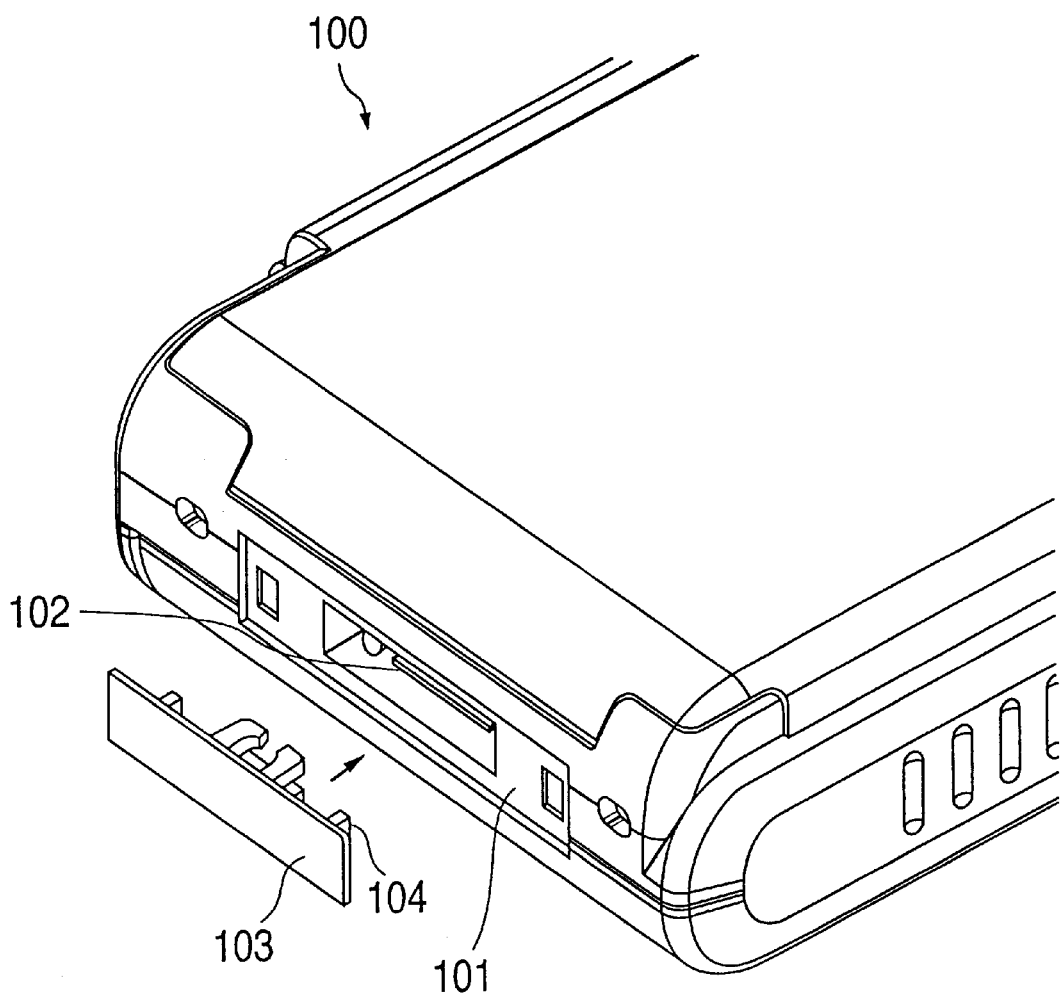
FIG. 1 is an illustration of a protective cover for an external electrical interface of an electronic device according to the present invention.

FIG. 1 illustrates an electronic device (100). For purposes of this particular example of the present invention, the electronic device (100) is illustrated as a wireless telephone. However, it will be understood by those skilled in the art that the present invention can be applied to any electronic device that uses an external interface port or connector to electrically connect to an external device or system, for example, a laptop or small computer. External devices or systems may include, but are not limited to, peripheral devices, accessories, external cables, networks, docking stations, power stations, and the like.

The wireless phone unit (100) shown in FIG. 1 has provided thereon at least one external interface port or connector (101) through which the phone unit (100) can be connected to, for example, a power source so as to recharge the internal battery pack of the phone unit or a computerized device for exchanging data with or through the phone unit (100). If the electronic device being illustrated where a laptop computer, the interface (101) might be used to connect the computer to a monitor, a keyboard, a printer, a modem, a docking station, a mouse, a LAN, a WAN or the like.

Where data is being exchanged, such interfaces (101) typically include a relatively delicate connector (102) that comprises a number of either pins or pin receptors. A mating connector (not shown) which is plugged into the connector (102) will have the opposite arrangement, pin receptors or pins, respectively, so as to plug into the connector (102) making an electrical connection. Such pin and pin receptors are easily damaged by dust, moisture or mechanical shock and must, therefore, be protected. An interface for a power source is generally more rugged, but must still be protected.

According to the present invention, a protective cover (103) is provided for covering and protecting the interface (101). In the example shown in FIG. 1, the cover (103) is provided with prongs (104) with which the cover (103) is snapped into place over the interface (101). However, it will be appreciated by those skilled in the art that any other method of mechanically connecting the cover (103) to the phone unit (100) so that the cover (103) can perform its function of protecting the interface (101) would be equivalent under the principles of the present invention.

Figure 2:
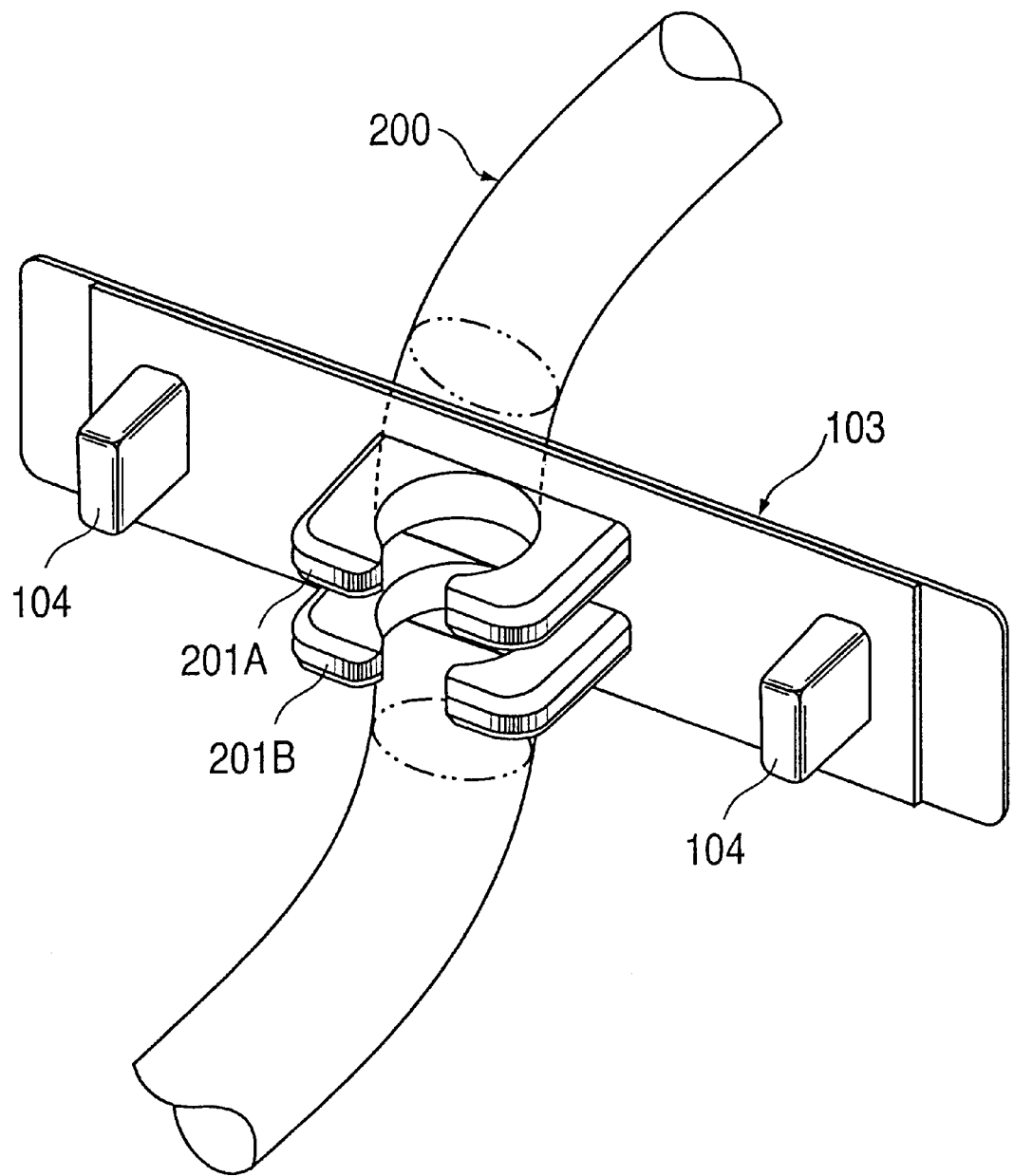
FIG. 2 is an illustration of the protective cover of the present invention as it is connected to a cable so as to prevent its being lost or misplaced.

As best seen in FIG. 2, the cover (103) also incorporates a means for preventing the cover (103) from being lost or misplaced when not attached to the phone unit (100) so as to protect the interface (101). In the example of FIG. 2, the cover (103) is provided with prongs (201) which are sized and shaped to engage, for example, an electrical cable (200).

As shown in FIG. 2, the prongs (201) may include two pairs of prongs to firmly engage the cable (200). FIG. 2 illustrates an upper (201A) and a lower (201B) pair of prongs engaging the cable (200).

The cable (200) may be any cable connected to the device (100). Preferably, the cable (200) includes a connector (not shown) which is mated to the connector (102) of the device (100). Consequently, when the cover (103) is removed from the device (100) to allow access to the connector (102), the cover (103) can be clipped using prongs (201) to a cable (200), preferably the cable being connected to the connector (102).

In this way, the cover (103) is much less likely to be misplaced or lost. When the cable (200) is disconnected from the device (100), the cover (103) will be noticed on the cable (200) and replaced on the device (100) to protect the interface (101).

Preferably, the prongs (201) are provided on an internal side of the cover (103) as shown in FIG. 1. In this way, the prongs (201) are hidden by the cover (103) within the casing of the telephone unit (100) when the cover is attached to the phone unit (100). Moreover, there is no protrusion on the external surface of the cover (103) that might become caught on clothing, a device case, or the like.

As will be appreciated by those skilled in the art, the principles of the present invention could be applied to a number of equivalent arrangements. For example, the prongs (201) may be sized and shaped so as to clip the cover (103) to something other than a cable. The prongs (201)

could be sized and shaped to allow the cover (103) to be clipped to some portion of the device (100) itself. In fact, the device (100) may have a portion specifically provided which is designed to engage the prongs (201) of the cover (103).

For example, the prongs (201) might be sized and shaped to engage an antenna, a side of a display screen, a wrist strap, or some other portion of the device (100). Preferably, when not covering the interface (101), the cover (103) is designed to engage some portion of the device (100) itself or a cable connecting to the device (100). This allows the cover (103) to be readily available when a connection to the interface (101) is broken or it is discovered that the interface (101) is not covered and protected.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A protective cover for an external electrical interface on an electronic device, said cover comprising:

first means for releasably engaging said cover to said electronic device in a position protecting said electrical interface while not electrically engaging said electrical interface; and second means, disposed on said cover, for releasably engaging said cover to at least one of a portion of said electronic device, to a second electronic device or to an electrical cable which can be connected to said electronic device, in a position removed from said interface so as to allow access to said interface.

2. The cover of claim 1, wherein said second means comprises at lease one pair of prongs which are sized and shaped so as to releasably engage said cover to the electrical cable.

3. The cover of claim 2 wherein said second means further comprises two pairs of prongs for releasably engaging said cable.

4. The cover of claim 1, wherein said portion of said electronic device is specially designed for engaging said cover.

5. A protective cover for an external electrical interface on an electronic device, said cover comprising:

a fastener for releasably attaching said cover to said electronic device in a position such that said cover protects said electrical interface while not electrically engaging said electrical interface; and prongs, separate from said fastener, on said cover for releasably engaging said cover with another object when said cover is not attached by said fastener in said position protecting said electrical interface.

6. The cover of claim 5, wherein said prongs are sized and shaped to engage an electrical cord as said another object.

7. The cover of claim 5, wherein said prongs are disposed on a side of said cover which is internal to a housing of said electronic device when said fastener attaches said cover to said electronic device to protect said electrical interface.

8. A method of using a protective cover for an external electrical interface on an electronic device so as to prevent said cover from being lost or misplaced, said method comprising releasably engaging said cover to an object when said cover is not in position protecting nor electrically engaging said electrical interface.

9. The method of claim 8, wherein said object is an electrical cable and said step of engaging further comprises releasably engaging a pair of prongs on said cover with said electrical cable.

10. The method of claim 9, further comprising connecting said cable to said electrical interface of said electronic device.

11. The method of claim 8, wherein said object is said electronic device and said step of engaging further comprises releasably engaging said cover with a portion of said electronic device which is removed from said electrical interface such that said cover does not protect said electrical interface or interfere with use of said electrical interface.

* * * * *